United States Patent
Alabes et al.

(10) Patent No.: US 10,628,132 B2
(45) Date of Patent: Apr. 21, 2020

(54) INVERSION OF CONTROL FRAMEWORK FOR MULTIPLE BEHAVIORS OF A PROCESS

(71) Applicant: Oracle International Corporation, Redwood Shores, CA (US)

(72) Inventors: Tomas Alabes, Foster City, CA (US); Fernando Alurralde Iturri, Foster City, CA (US); Nicolas Laplume, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/684,802

(22) Filed: Aug. 23, 2017

(65) Prior Publication Data

US 2018/0074796 A1 Mar. 15, 2018

Related U.S. Application Data

(60) Provisional application No. 62/395,386, filed on Sep. 16, 2016, provisional application No. 62/395,341, filed on Sep. 15, 2016.

(51) Int. Cl.
*G06F 8/34* (2018.01)
*G06F 8/60* (2018.01)
*G06F 8/20* (2018.01)
*G06Q 10/06* (2012.01)
*G06F 8/10* (2018.01)

(52) U.S. Cl.
CPC .................. *G06F 8/34* (2013.01); *G06F 8/10* (2013.01); *G06F 8/20* (2013.01); *G06F 8/60* (2013.01); *G06Q 10/067* (2013.01)

(58) Field of Classification Search
CPC .. G06G 8/10; G06G 8/20; G06G 8/34; G06G 8/60; G06Q 10/06; G06Q 10/067
See application file for complete search history.

(56) References Cited

U.S. PATENT DOCUMENTS

| | | | | |
|---|---|---|---|---|
| 7,237,193 | B1 * | 6/2007 | Zaky | G06F 17/212 715/205 |
| 7,681,176 | B2 * | 3/2010 | Wills | G06F 8/34 717/104 |
| 7,971,194 | B1 * | 6/2011 | Gilboa | G06F 8/10 717/106 |
| 8,046,772 | B2 * | 10/2011 | Upton | G06F 9/541 717/100 |

(Continued)

*Primary Examiner* — Ziaul A Chowdhury
(74) *Attorney, Agent, or Firm* — Trellis IP Law Group, PC

(57) ABSTRACT

Implementations generally relate to providing process modes. In some implementations, a method includes receiving view descriptors at a client device, where the view descriptors define how a process model is rendered and define how the process model behaves when rendered. The method further includes storing the view descriptors at the client device. The method further includes receiving, at the client device, a process mode selection from a user, where the process mode selection selects a process mode of a plurality of process modes, and where the selected process mode is associated with a set of the view descriptors. The method further includes retrieving the process model from a server. The method further includes applying the process model at the client device based on the set of the view descriptors associated with the selected process mode.

8 Claims, 7 Drawing Sheets

(56) References Cited

U.S. PATENT DOCUMENTS

| | | | | |
|---|---|---|---|---|
| 8,954,952 | B2* | 2/2015 | Guizar | G06F 8/60 717/168 |
| 2002/0108101 | A1* | 8/2002 | Charisius | G06F 8/20 717/105 |
| 2002/0147606 | A1* | 10/2002 | Hoffmann | G06F 8/34 717/100 |
| 2003/0110315 | A1* | 6/2003 | Upton | G06F 9/541 719/328 |
| 2003/0154191 | A1* | 8/2003 | Fish | G06F 8/34 |
| 2004/0002919 | A1* | 1/2004 | Tosswill | G06Q 20/10 705/40 |
| 2004/0250204 | A1* | 12/2004 | Isaacson | G06F 17/212 715/236 |
| 2004/0254945 | A1* | 12/2004 | Schmidt | G06F 8/34 709/203 |
| 2005/0262475 | A1* | 11/2005 | Halpern | G06F 8/71 717/114 |
| 2006/0129443 | A1* | 6/2006 | Chen | G06F 8/34 715/771 |
| 2006/0228654 | A1* | 10/2006 | Sanjar | G06F 8/34 430/438 |
| 2007/0143305 | A1* | 6/2007 | van Wyk | G06F 8/34 |
| 2008/0065615 | A1* | 3/2008 | Bober | G06K 9/00201 |
| 2010/0088323 | A1* | 4/2010 | Ashkenazi | G06F 16/904 707/752 |
| 2010/0199261 | A1* | 8/2010 | Shenfield | G06F 8/20 717/107 |
| 2010/0229150 | A1* | 9/2010 | Stone | G06F 8/00 717/104 |
| 2010/0287530 | A1* | 11/2010 | MacLean | G06F 8/10 717/105 |
| 2012/0072884 | A1* | 3/2012 | Balko | G06F 8/35 717/104 |
| 2014/0013199 | A1* | 1/2014 | Buurman | G06F 19/321 715/226 |
| 2014/0101554 | A1* | 4/2014 | Morris | H04L 67/36 715/733 |
| 2014/0173454 | A1* | 6/2014 | Sanchez | G06F 8/20 715/747 |
| 2014/0365437 | A1* | 12/2014 | Srinivasan | G06F 17/30575 707/634 |
| 2015/0227865 | A1* | 8/2015 | Filatov | G06Q 10/067 705/317 |
| 2016/0274875 | A1* | 9/2016 | Farooqi | G06F 8/36 |
| 2018/0060779 | A1* | 3/2018 | Suri | G06Q 10/06316 |

* cited by examiner

INVERSION OF CONTROL FRAMEWORK FOR MULTIPLE BEHAVIORS OF A PROCESS

CROSS REFERENCES TO RELATED APPLICATIONS

This application claims priority from U.S. Provisional Patent Application Ser. No. 62/395,386, entitled INVERSION OF CONTROL FRAMEWORK FOR MULTIPLE BEHAVIORS ON TOP OF A PROCESS, filed on Sep. 16, 2016 (Trellis ref ORACP0167P/Client ref. ORA170296-US-PSP) which is hereby incorporated by reference as if set forth in full in this application for all purposes.

This application is related to the following application U.S. Provisional patent application Ser. No. 62/395,341, entitled SYSTEM FOR PROCESS CLOUD SERVICE, filed on Sep. 15, 2016 (Trellis ref ORACP0192P/ client ref. ORA170390-US-PSP), which is hereby incorporated by reference as if set forth in full in this application for all purposes.

BACKGROUND

Efficient, adaptable, and insightful management systems and methods can be particularly important in enterprise applications, where accurate management and informed decision making can enhance enterprise profits. Some management systems improve corporate performance by managing and optimizing a company's processes. Such systems enable organizations to be more efficient and effective. Conventional managements systems may provide processes for designing enterprise-related processes or operations. Such processes are provided by a server, and may provide a designer with a single view of a given process without much flexibility.

SUMMARY

Implementations generally relate to providing process models. Implementations provide an inversion of control (IoC) framework, where control of the rendering and behavior of a process model and its views is passed from a server to a client. View descriptors applied to the process model at the client device provide various process modes of a process editor and associated views that give a designer flexibility in building and/or modifying a process model.

In some implementations, a non-transitory computer-readable storage medium carries program instructions thereon. When executed by one or more processors, the instructions cause the one or more processors to perform operations including receiving view descriptors at a client device, where the view descriptors define how a process model is rendered and define how the process model behaves when rendered. The instructions when executed further cause the one or more processors to perform operations including storing the view descriptors at the client device; and receiving, at the client device, a process mode selection from a user, where the process mode selection selects a process mode of a plurality of process modes, and where the selected process mode is associated with a set of the view descriptors. The instructions when executed further cause the one or more processors to perform operations including retrieving the process model from a server; and applying the process model at the client device based on the set of the view descriptors associated with the selected process mode.

A further understanding of the nature and the advantages of particular embodiments disclosed herein may be realized by reference of the remaining portions of the specification and the attached drawings.

DETAILED DESCRIPTION OF EMBODIMENTS

Figure 1:
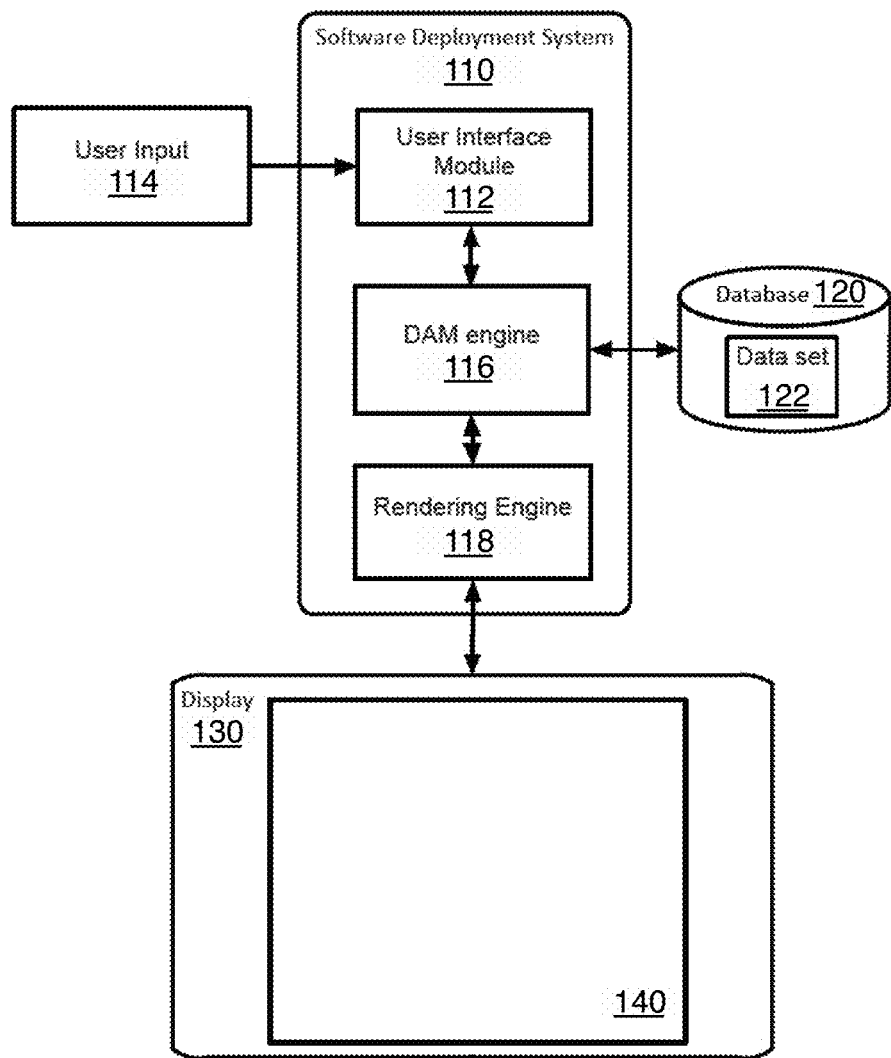
FIG. 1 illustrates an example block diagram of a computing system, which may be used for implementations described herein.

Implementations described herein generally relate to providing process models. As described in more detail herein, various implementations provide a configurable inversion of control (IoC) framework on the client-side of a process model, where control of the rendering and behavior of the process model and its views is passed from a server to a client. View descriptors applied to the process model at the client device provide various process modes of a process editor and associated views that give a designer flexibility in building and/or modifying a process model. The client controls how the process model is rendered and how the process model behaves when rendered based on view descriptors that are stored at the client. The view descriptors define the rendering and behavior of the process model, and are applied to the process model at the client device. As a result, the user (e.g., designer) can select a process view or process mode at the client, and the client renders the process model according to the selected process mode.

In some implementations, a client device receives view descriptors and stores the view descriptors at the client device. As described in more detail herein, the view descriptors define how a process model is rendered and define how the process model behaves when rendered. The client device receives a process mode selection from a user, where the selected process mode is associated with a set of the view descriptors. The client device retrieves the process model from a server. The client device then applies the process model at the client device based on the set of the view descriptors associated with the selected process mode.

The following are definitions to provide further context and applications of implementations described herein. In various implementations, an enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

Software functionality may be any function, capability, or feature, e.g., stored or arranged data, that is provided via computer code, e.g., software. Generally, software functionality may be accessible via use of a user interface (UI), and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

In various implementations, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, where the input affects a UI display screen and/or accompanying software application associated with the software.

A UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes, graphs, tables, and so on. In certain cases, a UI display screen may refer to all application windows presently displayed on a display. The terms UI display screen and screen may be employed interchangeably herein.

A UI display screen generated by a networked software application and accessible via a browser is called an application page (or simply page) herein. A UI component may be an application page or collection of related or linked pages.

An enterprise computing environment may be any collection of computing resources of an organization used to perform one or more tasks involving computer processing. An example enterprise computing environment includes various computing resources distributed across a network, and may further include private and shared content on intranet web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include human resources (HR) (e.g., enterprise personnel), financial resources, assets, employees, business contacts, sales data, and so on, of an enterprise. Examples of enterprise software include enterprise resource planning (ERP) software for facilitating managing enterprise activities (e.g., product planning, inventory management, marketing, sales, and so on). Example ERP applications include customer relationship management (CRM), human capital management (HCM), business intelligence (BI), enterprise asset management, enterprise asset management, corporate performance and governance applications, and so on.

The terms "enterprise software" and "enterprise application" may be employed interchangeably herein. However, an enterprise application may include one or more enterprise software modules or components, such as UI software modules or components.

Note that conventionally, while certain financial tools, tables, and so on (e.g., balance sheets, cash flow statements, etc.), are standardized, different companies may prefer to maintain and view operational and financial planning data and tasks differently, e.g., in accordance with different business and computing environment requirements. This can be particularly true at granular levels, i.e., where detailed enterprise data must be observed and analyzed in accordance with business planning objectives.

For example, a particular service company may experience substantial compensation expenses (e.g., payments to employees, contractors, etc.), which may represent the primary driver for expense planning. Similarly, a small consulting company may experience substantial travel expenses, which may represent a primary driver for expense planning. Accordingly, two different service companies may base their expense planning on substantially different drivers.

Similarly, different companies may employ different methods of accounting, e.g., a direct method or indirect method of accounting. Accordingly, different companies may rely upon different drivers for handling accounting details.

Furthermore, the granularity of planning (i.e., the level of detail demanded or required) may vary across different companies and/or business types, segments, or other domains. For example, a fast moving consumer goods company may plan revenue by product, market, channel, and segment, whereas an information technology (IT) company may plan revenue by service, market, and customers. Accordingly, different companies may rely upon different drivers for various types of planning.

In addition, while certain companies may prefer to perform business planning using a collection of standard or common drivers and associated software modules and functionality (e.g., standard labor, material, etc.), other companies may prefer to perform direct entry for project expenses, revenue, etc.

Accordingly, different businesses may have different planning requirements or needs, which can be difficult to meet using conventional static business planning modules and associated software applications. Certain implementations discussed more fully below provide systems and accompanying mechanisms and methods for enabling dynamic adaptation of an existing initial business planning model (which may be called a seed model herein), thereby enabling the initial seed planning model to uniquely grow to meet individual or specific needs of a given business or organization.

For clarity, certain well-known components, such as hard drives, processors, operating systems, power supplies, routers, Internet service providers (ISPs), identity management systems, workflow orchestrators, process schedulers, integration brokers, tenant automation systems (TASs), online analytical processing (OLAP) engines, certain web services, virtual machines, middleware, enterprise databases, and so on, are not necessarily explicitly called out in the figures. However, those skilled in the art with access to the present teachings will know which components to implement and how to implement them to meet the needs of a given implementation.

FIG. 1 illustrates an example block diagram of a computing system 100, which may be used for implementations described herein. Computing system 100 provides an interface layer, such as an application program interface (API). The interface layer provides users with seamless connectivity between different instantiations of an application located in different environments (e.g., development environment, production environment, etc.). Computing system 100 may be any computing system, such as an enterprise computing environment, client-server system, and the like.

Computing system 100 also includes software management system 110, also referred to herein as software deployment system 110. Software management system 110 may include a user interface module 112. User interface module 112 may be configured to receive and process data signals and information received from a user interface 114, also referred to herein as user input 114. For example, user interface module 112 may be adapted to receive and process data from user input associated with data for processing via software management system 110. Software management system 110 is configured to process data received from user interface 114, such as a keyboard, mouse, etc. for receiving user input.

Software management system 110 may also include a process engine 116, also referred to herein as digital asset management (DAM) engine 116, and a rendering engine 118. Process engine 116 may be configured as an API or any interface or data structure that may be used to advantage.

In some implementations, computing system 100 may include a data source such as database 120. Database 120 may be connected to the software management system 110 directly or indirectly, for example via a network connection, and may be implemented as a non-transitory data structure stored on a local memory device, such as a hard drive, solid state drive (SSD), flash memory, and the like, or may be stored as a part of a cloud network, as further described herein.

Database 120 may contain one or more data sets 122. Data sets 122 may include data as described herein. Data sets 122 may also include data pertaining to data attributes, data hierarchy, nodal positions, values, summations, types of charts of visualizations, algorithms, code (e.g., C++, Javascript, JSON, etc.), source, security, hashes, XML, and the like. In addition, data sets 122 may also contain other data, data elements, and information such as metadata, labels, development-time information, runtime information, configuration information, API, interface component information, library information, pointers, and the like.

In various implementations, software management system 110 is connected to a display 130 configured to display data 140 (e.g., graphical data, etc.), for example, to a user thereof. Display 130 may be a passive or an active display, adapted to allow a user to view and interact with display data 140 displayed thereon, via user interface 114. In other configurations, display 130 may be a touch screen display responsive to touches, gestures, swipes, and the like for use in interacting with and manipulating display data 140 by a user thereof. Gestures may include single gestures, multi-touch gestures, and other combinations of gestures and user inputs adapted to allow a user to convert, model, generate, deploy, and maintain display data 140.

In various implementations, process engine 116 may be adapted to receive data from user interface 114 and/or database 120 for processing thereof. In one configuration, process engine 116 is a software engine configured to receive and process input data from a user thereof pertaining to display data 140 from user interface 114 and/or database 120 in order to provide the process API layer.

Process engine 116 in other implementations may be configured as a data analysis tool to perform analysis functions associated with display data 140. Such analysis functions may include determining attributes associated with the data, partitions, local and remote pods (layers), communication protocols, determining the relationships to other data, interpreting metadata associated with the data, and the like. For example, process engine 116 may be configured to receive and analyze data sets 122 to determine user interface configuration, data processing instructions, data attributes, data hierarchy, nodes, nodal positions within the hierarchy, values, summations, algorithms, source, security, hashes, and the like, associated with data sets 122.

Process engine 116 may receive existing data sets 122 from database 120 for processing thereof. Such data sets 122 may include and represent a composite of separate data sets 122 and data elements pertaining to, for example, organizational data, which may include employment data, salary data, personnel data, and the like. In addition, data sets 122 may include other types of data, data elements, and information such as contact data, sales data, production data, scientific data, financial data, medical data, census data, and the like.

Rendering engine 118 may be configured to receive configuration data pertaining to display data 140, associated data sets 122, and other data associated with display data 140 such as user interface components, icons, user pointing device signals, and the like, used to render display data 140 on display 130. In one exemplary implementation, rendering engine 118 may be configured to render two-dimensional (2D) and three-dimensional (3D) graphical models and simulations to allow a user to obtain more information about data sets 122. In one implementation, upon receiving instruction from a user, for example, through user interface 114, rendering engine 118 may be configured to generate a real-time display of interactive changes being made to display data 140 by a user thereof.

Note that the computing system 100 presents a particular example implementation, where computer code for implementing embodiments may be implemented, at least in part, on a server. However, embodiments are not limited thereto. For example, a client-side software application may implement software management system 110, or portions thereof, in accordance with the present teachings without requiring communications between the client-side software application and a server.

Figure 2:
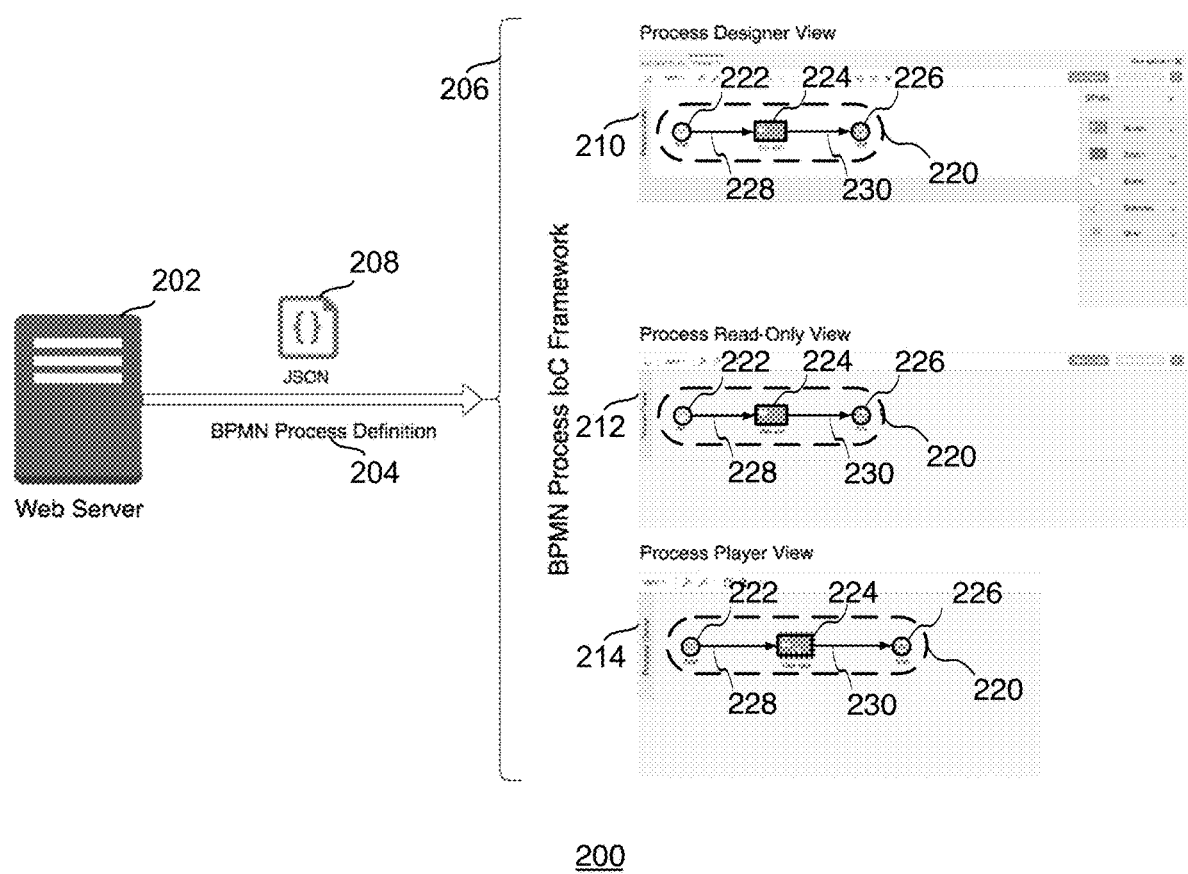
FIG. 2 illustrates an example block diagram of a process mode environment, according to some implementations.

FIG. 2 illustrates an example block diagram of a process mode environment 200, according to some implementations. As shown, process mode environment 200 includes a server 202, which may be a web server.

In various implementations, server 202 sends process definition information 204 to the client device. Process definition information 204 may include business process model and notation (BPMN).

Process definition information 204 may be in the form or format of JavaScript object notation (JSON) data 208, or other suitable formats. JSON data is an open-standard format that uses human-readable text to transmit data objects consisting of attribute-value pairs.

As indicated herein, implementations provide a process designer application that has a configurable inversion of control (IoC) architecture or framework, or IoC framework 206, on the client-side of a process. IoC framework 206 provides several modes of a process editor that presents several faces or views of the process depending on the process mode. Various modes provide different graphical models, and algorithms are applied to give the style and behavior, capabilities, and data that a user may want to use.

Shown are process designer view 210, process read-only view 212, and process player view 214. These are examples views that the system may display based on the determined process mode. Implementations directed to these views are described in more detail herein.

Process designer view 210 displays a rendered process model 220. Process model 220 includes various process elements such as a start process element 222, a task process element 224, and an end process element 226. As described in more detail herein, process designer view 210 enables a user to design, build, and/or modify a process model or process (e.g., add permissions, etc.). A rendered process model is used to model a process (e.g., business process). As used in the descriptions herein, if a user designs, builds, modifies, view, or runs a process model, the user designs, builds, modifies, view, or runs a process. In various implementations described herein, the terms process model or process may be used interchangeably in to indicate that both the process model and process is being designed, built, modified, viewed, run, etc.

In various implementations, start process element 222 may represent different types of start events. For example, a start event may be a document start event, where a process is initiated by a user opening a document or opening a folder. In some implementations, a start event may be a message start event, where a process is initiated when the system receives a particular message from another process or a service. In some implementations, a start event may be a message start event, where a process is initiated when the system receives a form (e.g., a loan application, and so on) from a user.

In various implementations, task process element 224 may perform a variety of tasks depending on the type tasks and particular implementation. For example, a human task process element may involve a user performing particular tasks, and a system task process element may involve the system performing particular tasks. End process element 226 ends the process.

Process model 220 also includes a sequence flow process element 228 that connects start process element 222 to task process element 224. As indicated by the arrow shown, sequence flow process element 228 generates a process path that flows in the direction of start process element 222 to task process element 224. Process model 220 also includes a sequence flow process element 230 that connects task process element 224 to end process element 226. As indicated by the arrow shown, sequence flow process element 230 generates a process path that flows in the direction of task process element 224 to end process element 226.

Process read-only view 212 displays the same rendered process model 220. As such, shown are process model 220 includes various process elements such as a start process element 222, a task process element 224, and an end process element 226. In various implementations, while the same process elements are rendered, the process elements behave differently in the different views. For example, as described in more detail herein, process read-only view 212 enables a user to view a process model or process without modifying the process model or process.

Process player view 214 also displays the same rendered process model 220. As such, shown are process model 220 includes various process elements such as a start process element 222, a task process element 224, and an end process element 226. As indicated herein, while the same process elements are rendered, the process elements behave differently in the different views. For example, process player view 214 enables a user to view a process instance running live, where the user can run the process model or process in a process player mode.

Figure 3:
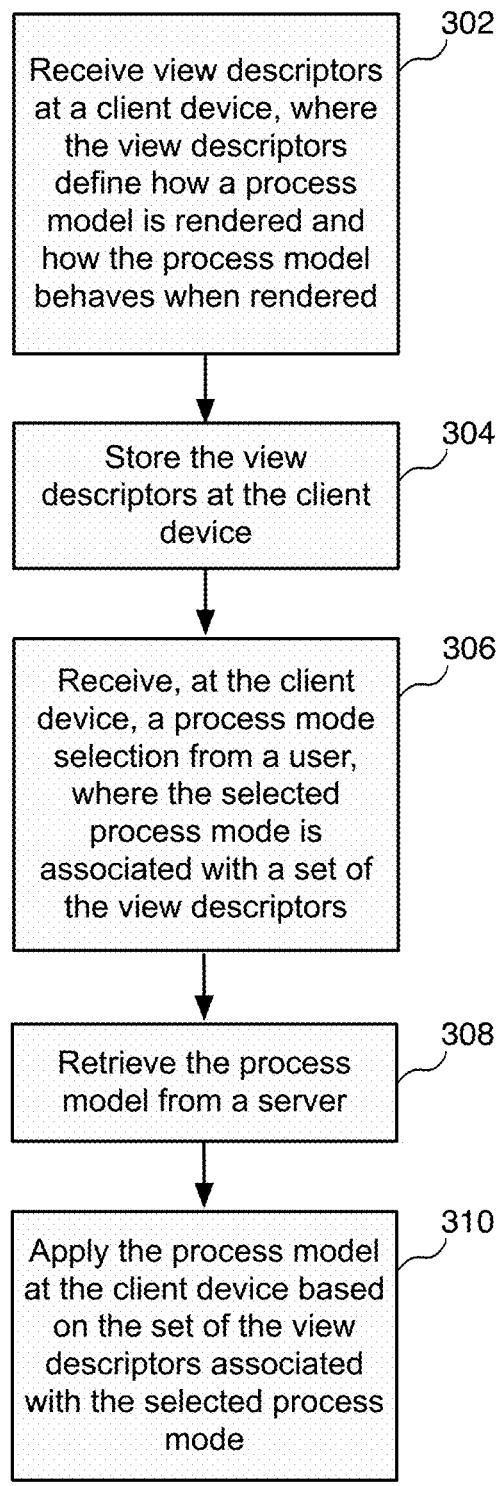
FIG. 3 illustrates an example flow diagram for providing process modes, according to some implementations.

FIG. 3 illustrates an example flow diagram for providing process modes, according to some implementations. Referring to both FIGS. 2 and 3, a method is initiated at block 302, where a system such as a client device receives view descriptors. In various implementations, view descriptors define how a process model is rendered and define how the process model behaves when rendered. For example, view descriptors may define whether a user (e.g., designer) may modify a process model, only view a process model, or simulate a process model.

At block 304, the system stores the view descriptors at the client device. In various implementations, the view descriptors are stored at the system (e.g., at the client device). In various implementations, storing view descriptors at the client device enables the client device to quickly access the view descriptors in order to apply the view descriptor to a process model for rendering.

At block 306, the system receives a process mode selection from a user. In various implementations, the process mode selection selects a process mode among a selection of process modes. In some implementations, the user interface may provide process mode selection buttons, a drop-down menu, etc. for user selection. Implementations enable a user to select a desired mode based on the needs of the user.

In some implementations, the process modes include one or more of a process designer mode, a process read-only mode, and a process play mode. For example, if the user intends to build and/or modify a process (e.g., add permissions, etc.), the user can design the process in a process designer mode, also referred to as an edit mode.

If the user simply wants to view a process model without modifying the process model, the user may view the process model in a process read-only mode, also referred to as a view mode.

If the user wants to view a process model instance running live, the user can run the process model in a process player mode. The process player mode enables a user to test or simulate a process model in order to ensure the process model is functioning properly, especially before deploying the process model (e.g., putting the process in production).

In various implementations, the selected process mode is associated with a set of the view descriptors. In some implementations, the view descriptors include rendering descriptors and behavior descriptors associated with the process model. As indicated herein, the view descriptors are accessed at the client device. This enables the user (e.g., designer) to more easily design, develop, maintain, and extend a process model.

In some implementations, the rendering descriptors define renderings of the process model. In some implementations, the renderings of the process model include visible user interface features. For example, user interface features may include flow objects (e.g., events, activities, gateways, etc.), connecting objects (e.g., sequence flow, message flow, associations, etc., swim lanes, artifacts (e.g., data objects, groups, annotations, etc.).

In some implementations, the behavior descriptors define the behavior of the process model when rendered. In some implementations, the behavior of the process model includes a range of actions performed by the model when rendered. In some implementations, the behavior descriptors include permissions associated with performance of particular acts. In some implementations, permissions may include permissions to delete, add or subtract process elements in a process model, view information, etc. The view descriptor defines everything that the user can see and do in a particular view. The performance of the actions may occur independent of the program core. This enables the client device to change process modes and thus views for the user without needing the server, resulting in quick and convenient process model changes for the user.

In some implementations, the process modes of the process model are defined by combinations of rendering descriptors and behavior descriptors. In some implementations, the view descriptors include a plurality of sets of the view descriptors, and where each set of the view descriptors is associated with a combination of rendering descriptors and behavior descriptors. In various implementations, whenever a new view is desired for a given process model, new sets of view descriptors with associated rendering descriptors and behavior descriptors may be created without needing to change the process model. Different rendering descriptors and behavior descriptors may be mixed and matched for a given purpose. For example, particular views such as those in the process designer mode and the process read-only mode may be rendered to appear the same, but they behave differently. Such differences are defined by the view descriptors. In various implementations, particular rendering descriptors and behavior descriptors may be reused and combined with different sets of view descriptors.

At block 308, the system retrieves the process model from a server. In some implementations, the client device receives the same process model regardless of the process mode or process model view, where the behavior and functionalities change based on the selected process mode. In various implementations, the system retrieves the process model each time a new process mode is selected.

At block 310, the system applies the process model at the client device based on the set of the view descriptors associated with the selected process mode. In various implementations, the system applies the process model at the system (e.g., at the client device). The system loads the process model in the appropriate view.

The browser renders the process model with different functionalities based on the process mode. In various implementations, scalable vector graphics (SVG) is used to render the process model. SVG is an XML-based vector image format for two-dimensional graphics and provides support for interactivity and animation. In some implementations, vector markup language (VML) may also be used to render the process model. VML is an XML-based file format for two-dimensional vector graphics.

Implementations of the IoC architecture provide several modes of a process editor, which present several faces or views of the process model depending on the process mode. In various implementations, these different modes provide different graphical models, and algorithms are applied to give the style and behavior, capabilities, and data that a user may want to use.

For example, if the user selects the process designer mode, the system displays process designer view 210. In process designer view 210, the user may design, build, and/or modify a process model (e.g., add permissions).

If the user selects the process read-only mode, the system would display process read-only view 212. The user may simply want to view a process model in a view mode, without making changes.

If the user selects the process player mode, the system would display process player view 214. Process player view 214 enables the user to simulate or watch the process model instances run live.

For ease of implementation, three views are shown and described. Other modes and views are possible depending on the implementation. For example, in some implementations, an audit trail mode is available that enables a user to see the process model instances that the process model went through during the process model design. With an audit trail, a user may review an entire loan application process, for example. Implementations are extensible for other modes as the process evolves, and depending on the particular implementation.

Figure 6:
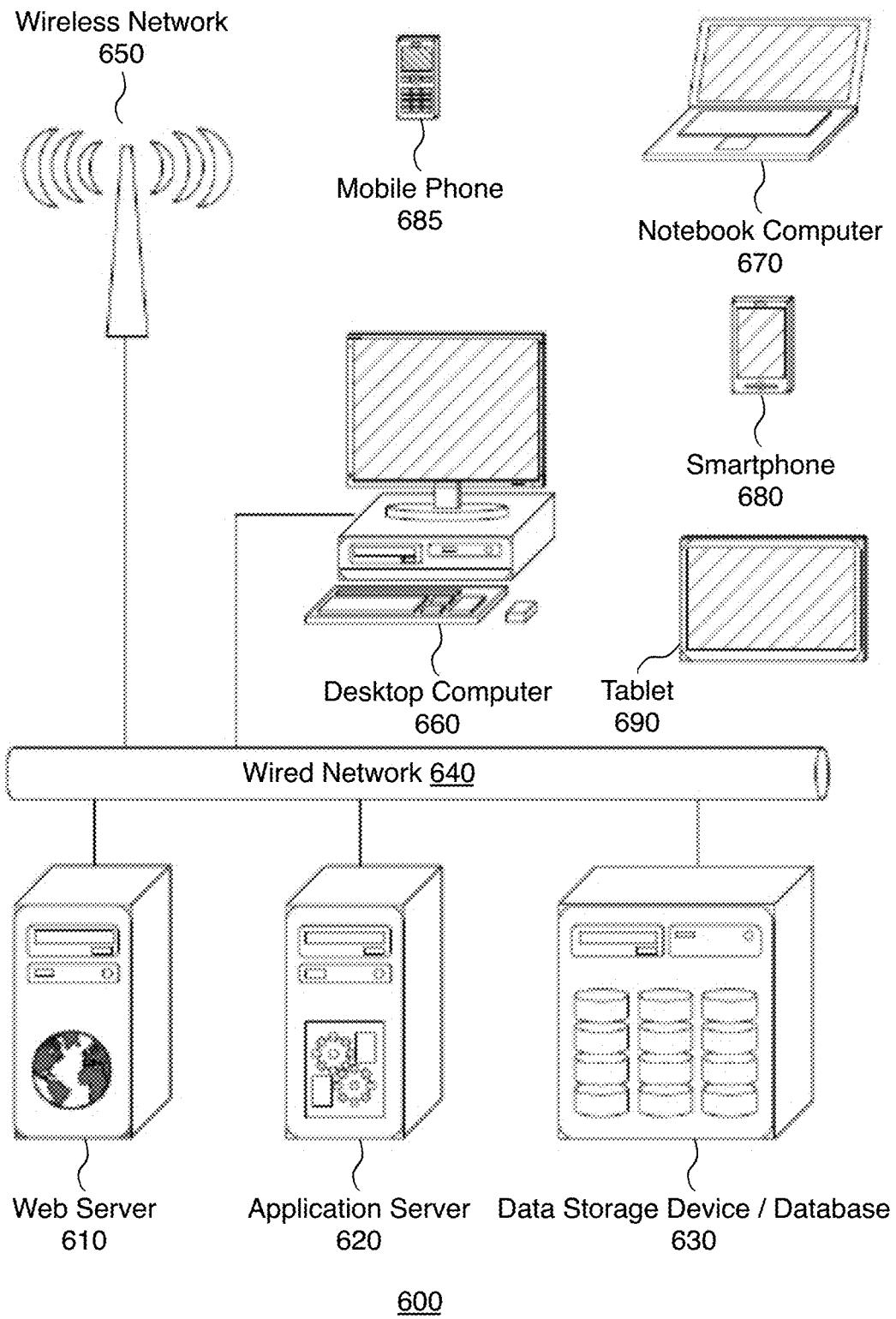
FIG. 6 illustrates an example block diagram of a system, which may be used for implementations described herein.

In various implementations, the steps described herein may be implemented by developer system 612 of FIG. 6, where the system receives the process element information from another system such as planning model generation framework 614 of FIG. 6. The steps described herein may also be implemented by software deployment system 110 of FIG. 1.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 4:
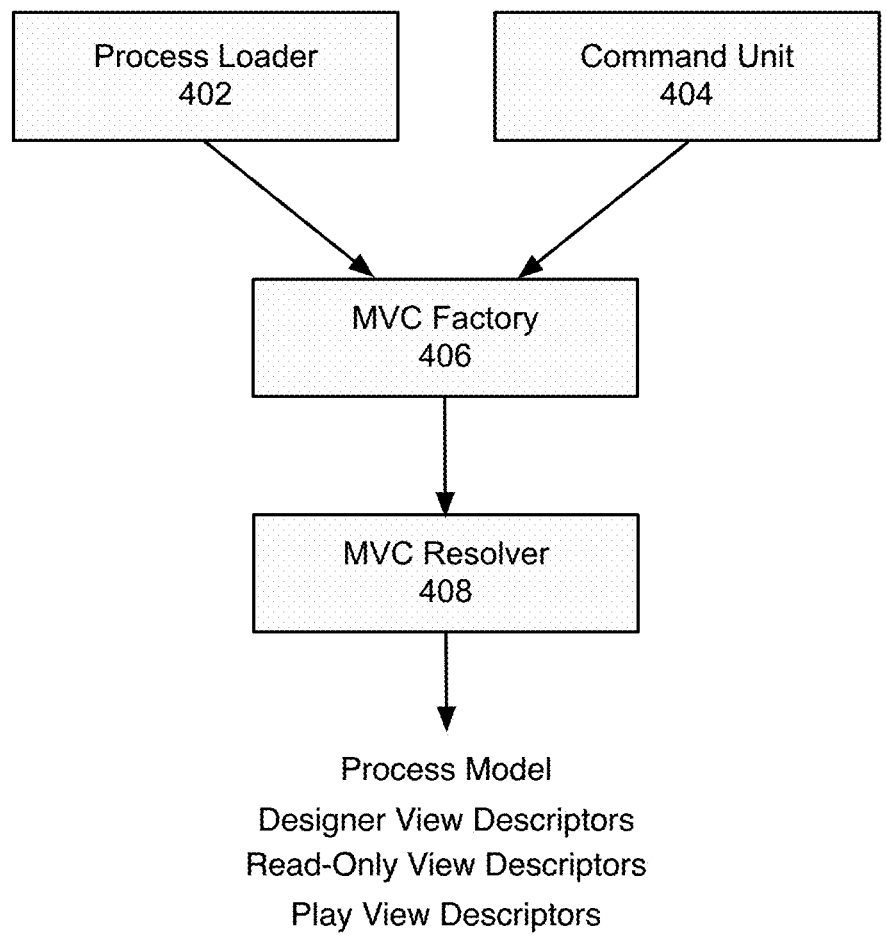
FIG. 4 illustrates an example block diagram of a process mode architecture, according to some implementations.

FIG. 4 illustrates an example block diagram of a process mode architecture 400, according to some implementations. Shown are example implementation details of the IoC framework, where the process mode architecture 400 includes a process loader 402, a command unit 404, a model-view-controller (MVC) factory 406, and an MVC resolver 408.

In various implementations, process mode architecture 400 provides the process model, designer view descriptors, read-only view descriptors, and play view descriptors, all of which provide the process elements (e.g., process, flow elements, toolbar, etc.) and associated behavior, style, and functionality. In various implementations, each process mode has a set of view descriptors, one view descriptor for each process element.

As indicated herein, the view descriptors include rendering descriptors and behavior descriptors, where the rendering descriptors define the renderings of the process model, and the behavior descriptors define the behavior of the process model when rendered. In some implementations, the view descriptors may be provided in JSON files (e.g., ProcessEditorViewDescriptors.js, ProcessReadOnlyViewDescriptors.js, ProcessPlayViewDescriptors.js, etc.).

In some implementations, process loader 402 provides various programs and libraries for execution, command unit 404 provides object requests, MVC factory 406 receives resources such as programs, libraries, and requests, and instantiates objects, including process elements, and MVC resolver 408 facilitates in implementing the IoC framework by resolving dependencies, locating services, etc.).

In various implementations, an MVC pattern is used, which divides the functionality of an application into three layers: model, view, and controller, where various different functionalities are separated in order to manage the design of the application. In some implementations, a model represents business objects, as well as access and update rules. A view displays the contents of a model to the user. A controller directs actions within an application.

Figure 5:
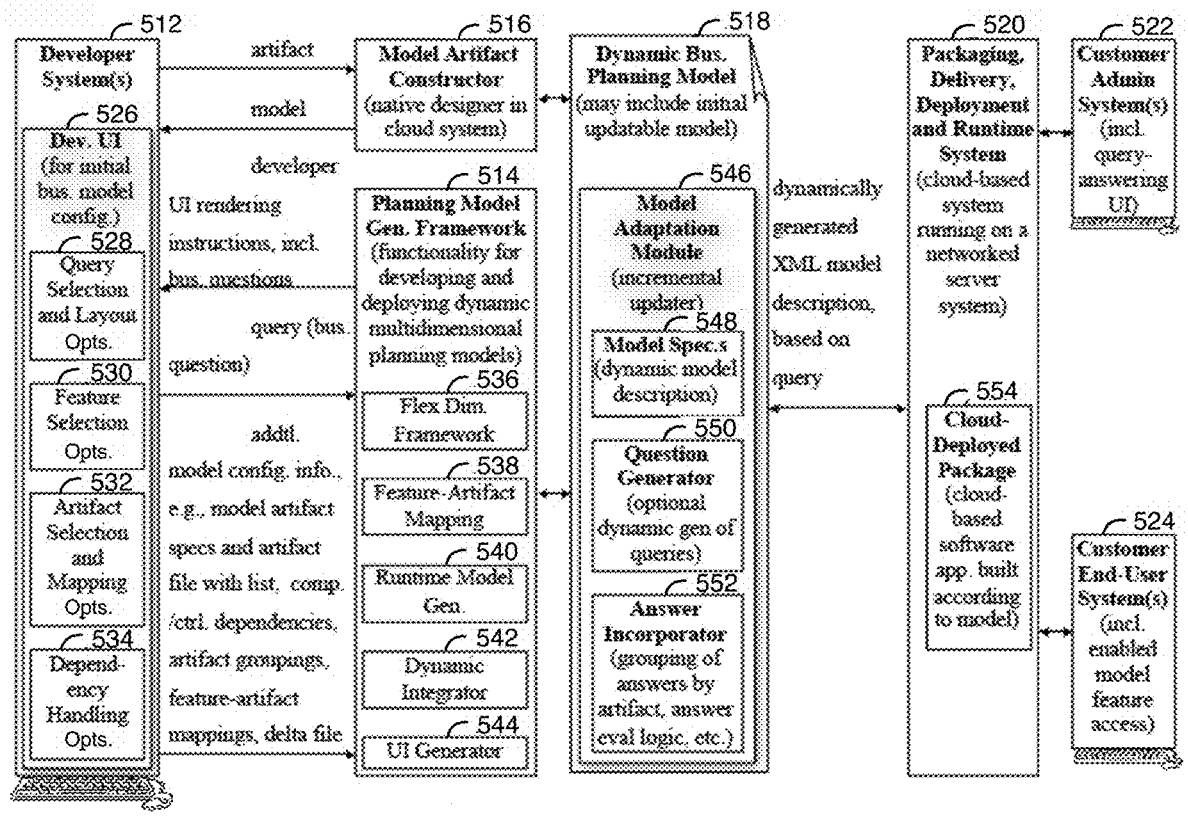
FIG. 5 illustrates an example block diagram of a system, which may be used for implementations described herein.

FIG. 5 illustrates an example block diagram of a system 500, which may be used for implementations described herein. In various implementations, system 500 is an enterprise-computing environment configured to enable initial development of a dynamic business planning model 518. In various implementations, system 500 incrementally updates business planning model 518 to meet specific enterprise needs, and uses resulting updated business planning model 518 as part of a cloud-based enterprise software application or service 554 (labeled "Cloud-Deployed Package"). While system 500 performs implementations described herein, in other implementations, any suitable component or combination of components associated with system 500 or any suitable module or module s associated with system 500 may facilitate performing the implementations described herein. In various implementations, system 500 may not have all of the components shown and/or may have other elements including other types of modules instead of, or in addition to, those shown herein.

System 500 includes a developer computer system 512 (labeled "Developer System(s)") that is in communication with a planning model generation framework 514 and a model artifact constructor 516. Computer system 512 may also be referred to herein as the developer system or the developer computer. Model artifact constructor 516 may leverage preexisting functionality, e.g., as may be available via a native designer in a cloud computing system implemented as part of system 500.

Planning model generation framework 514 and model artifact constructor 516 that are leveraged to develop business planning model 518, may further communicate with a packing, delivery, deployment and runtime system and/or computing framework 520 (labeled "Packaging, Delivery, Deployment and Runtime System"). Modules 514-520 may be hosted in a cloud, i.e., a server system accessible via a network, such as the Internet.

A cloud-deployed package 554, i.e., software application, embodying business planning model 518 is may be hosted in the cloud, i.e., cloud-based. For the purposes of the present discussion, cloud-based software may be any software run on one or more servers and accessible to client systems via a network used to communicate with the software.

In some implementations, cloud-deployed package 554 may represent a software application that may provide one or more web services for use by other software applications, and/or may provide cloud-services, e.g., on a subscription basis, to one or more client systems, e.g., a customer administrator system 522 (labeled Customer Admin System (s), and a customer end-user system 524 (labeled Customer End-User System(s). For the purposes of the present discussion, the term "customer" refers to any user, such as an administrator and/or end user, e.g., who may be part of an organization that has access to cloud-deployed package 554.

In some implementations, a developer system 512 accesses model artifact constructor 516 and planning model generation framework 514 via a network, such as the Internet. Developer system 512 may include a browser used to browse to the network address that provides access to functionality provided by model artifact constructor 516 and planning model generation framework 514.

After browsing to a network address allotted for system developers, designers, and/or other qualified personnel, various dynamic model-building functionality is accessible to the developer system, e.g., via various developer UI display screens 526 (labeled "Dev.UI").

Software functionality may be any function, capability, or feature, e.g., stored or arranged data, that is provided via computer code, e.g., software. Generally, software functionality may be accessible via use of a UI, and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

Software functionality, or a set of software functionalities, that is/are associated with or used by a business planning model, is called a model feature (or simply feature) herein. Examples of features include, but are not limited to, software functionality for implementing indirect cash flow statements, income statements, and so on.

For the purposes of the present discussion, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, where the input affects a UI display screen and/or accompanying software application associated with the software. The terms UI control and UI component (or simply component) may be employed interchangeably herein.

A descriptor or characteristic of a business planning model and/or associated UI display screens and/or UI layout, is called a model artifact (or simply artifact) herein. Examples of model artifacts include, but are not limited to metadata (e.g., metadata describing a UI layout or UI model framework), dashboards, business rules, forms, dimensions, and so on.

Artifacts may represent or be associated with categories of features or software functionality. When functionality is associated with a business model artifact, the artifact may be seeded with one or more functionalities or features.

Artifacts and features may be dependent or independent. A dependent artifact or feature is one that relies upon the existence or operation of another artifact or feature for proper functioning. Similarly, an independent artifact or feature may be added to a model without requiring special handling of interdependencies, as discussed more fully below. Examples of potential dependent artifacts include, but are not limited to composite forms, rule sets, and so on.

A valid artifact may be any artifact that may be associated with (e.g., seeded with) one or more features that are available for a business planning model. The availability of a feature to an artifact may be defined in initial business planning model 518, e.g., by a developer using business planning model designer software represented by planning model generation framework 514 and model artifact constructor 516.

In some implementations, developer UI display screens 526 include a query-selection UI display screen (and/or set of UI controls) 528, a feature-selection UI display screen 530, an artifact-selection UI display screen 532 (labeled "Artifact Selection and Mapping Opts," and an artifact and feature dependency handling UI display screen 534.

Planning model generation framework 514 includes a flex-dimension framework 536, a feature-artifact mapping module 538, a runtime model generator 540, a dynamic functionality integrator 542, and a UI generator 544.

Generated, dynamic, business planning model 518, which may be defined by and/or specified via an extensible markup language (XML) document, includes a specification 548 (labeled "Model Specs") of business planning model 518, and optionally, embedded question generator code (or a link to code) 550 and answer incorporator 552, e.g., for facilitating incorporating answers to business questions, as may be provided via the customer administrator system 522 (labeled "System(s)," as discussed more fully below.

Packaging, delivery, deployment, and runtime system 520 hosts and runs deployed cloud-based software package or application 554, also referred to as "cloud-deployed package" 554. Functionality of deployed application 554, also referred to as "cloud-deployed package 554," is accessible to customer end-user client system 524.

Note that in general, groupings of various modules of system 500 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, a question generator 550 and answer incorporator 552 shown as part of dynamic business planning model 518 may instead, or in addition, be incorporated into planning model generation framework 514.

Furthermore, certain modules of planning model generation framework 514 may be implemented client-side, e.g., on developer system 512. In general, certain server-side, i.e., cloud-based modules (e.g., running on a server or server system) may be implemented client-side (e.g., running on a client computer communicating with a server), and vice versa, in a manner different than shown in FIG. 5.

In an example scenario, a business model developer (also called designer herein) employs developer system 512, e.g., artifact-selection screen 532, to specify, access, and/or configure model artifacts, leveraging model artifact constructor 516. Artifact-selection screen 532 presents one or more UI controls (which may provide so-called user options, or simply options) for facilitating developer construction, selection, and configuration of model artifacts, as well as UI controls enabling configuration and/or specification of mappings and/or rules associated with the artifacts. The mappings discussed herein refer to associations between business model artifacts and features, and are also called feature-artifact and/or artifact-feature mappings.

After developing and/or configuring a set of one or more business model artifacts, e.g., by leveraging artifact-selection screen(s) 532 and associated model artifact constructor 516, the resulting artifacts may be stored locally or via the server system that hosts modules 514-520.

Next, in the present example scenario, the developer employs feature-selection screen 530 to select and/or configure a set of business model features. Feature construction and/or selection may also be facilitated via model artifact constructor 516 and/or code run as part of planning model generation framework 514, e.g., via code run on feature-artifact mapping module 538.

After initial selection and/or configuration of a set of one or more model artifacts and one or more model features, the developer may employ one or more UI controls of artifact-selection screen 532 to configure and/or specify initial mappings and/or associated mapping rules that define associations between the configured artifacts and features.

Artifact-selection and mapping screen 532 may include UI controls that leverage the functionality of feature-artifact mapping module 538 of planning model generation framework 514. Feature-artifact mapping module 538 may include additional code for implementing automatic feature-artifact mappings in accordance with groupings of business questions and/or answers to the business questions, e.g., so as to automatically update dynamic business planning model 518, as discussed more fully below.

UI generator 544 of planning model generation framework 514 includes code for generating rendering instructions to render developer-side UI display screens 526, and further includes code for generating rendering instructions for UI display screens of cloud-deployed package 554, which are exposed to customer end-user system 524.

Developer-side query-selection and layout options screen 528 includes UI controls and access to associated functionality for defining, selecting, and/or grouping business questions (called queries) to be exposed in a UI display screen accessible to customer administrator system 522. The UI display screens are displayed as part of the dynamic business planning model 518 and are exposed to the customer administrator system 522, and include a UI display screen that lists business questions that have been enabled for existing dynamic business planning model 518.

The initial business questions selected by a developer using query-selection and layout options screen 528 may be listed and/or otherwise formatted in accordance with developer-selected layout options provided via query-selection and layout options screen 528. UI controls of query-selection and layout options screen 528 provide developer-access to associated functionality (e.g., functionality which may be provided via UI generator 544 and feature-artifact mapping module 538 and/or other modules of planning model generation framework 514) for defining, selecting, and/or otherwise configuring business questions and how the questions will be laid out in a UI display screen exposed to a customer administrator, e.g., via customer administrator system 522.

Mappings of artifacts are grouped by business question or by business question group or type. Mappings of artifacts to features may depend, in part, on the business questions established via use of query-selection and layout options screen 528.

The developer may further specify dependency-handling options via one or more UI controls provided in dependency-handling options screen 534. The dependencies may include dependencies between business questions (e.g., in cases where the answer to one business question may affect other questions or answers, and dependencies between different artifacts (and/or groups or types of artifacts), and dependencies between different features (and/or groups or types of features). Such dependencies may require that a change (e.g., difference) in one question, artifact, and/or feature, be propagated to another question, artifact, and/or feature.

Various implementations discussed herein may employ difference or delta processing to ensure that dependencies are handled without introducing conflicts. This involves referencing the established associations and associated selected configuration options (e.g., as may be specified by a developer via dependency-handling options screen 534) and making adjustments to the business model based thereon and in response to a detected change in an artifact, feature, question, etc.

Accordingly, developer system 512 forwards business question selections and associated identifications, descriptions, and/or configuration information (e.g., as may be provided responsive to developer manipulation of query-selection and layout options screen 528) to business planning model generation framework 514. In addition, various additional UI controls included among developer UI display screens 526 may enable specification and forwarding of additional information to planning model generation framework 514, including, but not limited to additional business model configuration information, e.g., model artifact specifications, an artifact file listing artifacts for an initial business planning model, component (e.g., UI control) dependencies (between UI controls to be rendered and exposed via cloud-deployed package 554), artifact grouping information, feature-artifact mapping data, delta file specifications (e.g., describing dependencies between various questions, artifacts, and/or features), feature specifications, flex dimension configuration parameters and/or specifications, and so on.

Business planning model generation framework 514 then processes the inputs received via developer system 512 to automatically construct an initial business planning model, also called the seed model. Some example modules usable to construct initial dynamic business planning model 518 and to implement incremental updates thereto, include, but are not limited to flex dimension framework 536, feature-artifact mapping module 538, runtime model generator 540, dynamic integrator 542, and UI generator 544.

Flex dimension framework 536 includes computer code for enabling customer administrators (e.g., using customer administrator system 522) and/or customer end users (e.g., using customer end-user system 514) to add flex dimensions to various UI display screens exposed via cloud-deployed package 554. Flex dimension framework 536 then enables extension of business planning model 518 in accordance with the added flex dimensions. Note that whether initial business planning model 518 supports flex dimensions, which flex dimensions, if any, are supported, and behaviors of the flex dimensions, may be specified by a developer via one or more UI controls provided in developer UI display screens 526.

Feature-artifact mapping module 538 includes computer code for enabling automatic implementation of changes introduced to dynamic business planning model 518 in response to answers provided in response to business questions posed to an administrator (or other authorized user) of customer administrator system 522. In particular, when an administrator provides a new answer to a question (e.g., which may be posed via a UI prompt, such as a check box), any artifacts associated with the question are then automatically populated with features via feature-artifact mapping module 538. The resulting populated artifacts are then incorporated into updated dynamic business planning model 518 after any artifact and/or feature dependencies are handled and/or deltas are processed.

Runtime model generator 540 includes computer code for automatically generating a new or updated dynamic business planning model 518 for incorporation into cloud-deployed package 554. The updates to running cloud-deployed package 554 by runtime model generator 540 may be implemented via patching and/or other known technologies for adjusting running software applications.

Dynamic integrator 542, which may communicate with other modules of planning model generation framework 514, facilitates implementing delta differencing processing to accommodate newly added functionality without introducing conflicts in updated business planning model 518. Integrator 542 may further include computer code for facilitating and/or ensuring efficient interoperability between different intercommunicating business planning models and associated software applications deployed via packaging, delivery, deployment, and runtime system 520.

Note that information exchange between developer system 512 and between various cloud-based modules 514-520 may be implemented via exchange of XML files that are also transferred between the system and modules. Furthermore, dynamic business planning model 518 may be implemented substantially via an XML document defining the model.

In some implementations, dynamic business planning model 518 includes a model adaptation module 546, which includes computer code for facilitating some self-adaptation of dynamic business planning model 518. Note that in other implementations, model adaptation module 546 may be included instead in planning model generation framework 514.

In some implementations, model adaptation module 546 includes, in addition to a description of the business planning model (including a description of existing questions, artifacts, and associated features), a specification of code for dynamic question generator 550 and answer incorporator 552.

Dynamic question generator 550 may include computer code (and/or links thereto) for automatically adjusting a list of business questions exposed via a UI of customer administrator system 522, e.g., in response to one or more answers provided thereby by an administrator using customer administrator system 522. This may be particularly useful for reconfiguring listing of displayed questions in response to an answer to a question that affects the validity of other questions displayed in (or to be displayed among) the listing of business questions.

Answer incorporator 552 may include computer code (and/or links thereto) for adjusting groupings of artifacts by answers and/or answer type or category. Answers to the business questions may be evaluated by evaluation logic to determine how a new listing of questions should be generated and laid out (in the UI exposed to the customer administrator system 522).

Note that various modules 536-544 of the business planning model generation framework 514 may intercommunicate, e.g., via interfacing functionality incorporated therein. Similarly modules 548-552 of model adaptation module 546 of dynamic business planning model 518 may intercommunicate.

Once initial business planning model 518 is developed and/or configured via developer system 512, it can be deployed as cloud-deployed package 554, which is then made available to customer administrator system 522 and customer end-user system 524. The customer administrator may then use customer administrator system 522 to answer business questions. The resulting answers then feed back to framework modules 514-520, which then adapt or update dynamic business planning model 518 in accordance with the answers. The adjustment to dynamic business planning model 518 is effectuated through use of artifacts, which are then mapped or seeded with features corresponding to the answered questions, and in accordance with the answers to the answered questions, as discussed more fully below.

Accordingly, the present example implementation may enable customers to substantially forgo, configuring and/or updating business planning software. Several business planning processes (which may be associated with different business planning models and/or sub-models) may be selectively and incrementally rolled out to customer end users (e.g., users of customer end-user system(s) 524). Furthermore, integration between added features (e.g., sets of software functionality associated with different business processes) is automatically accommodated, e.g., via dynamic integrator 542 and feature-artifact mapping module 538 of business planning model generation framework 514.

Furthermore, by enabling customer addition of and configuration of flex dimensions to dynamic business planning model 518, the resulting automatically handled dimensions can significantly reduce implementation time for customers to implement new features and associated business model artifacts.

Customers now have significant flexibility and options for configuring various planning business processes. Customers can leverage these configuration capabilities, reduce implementation time, and continue building the model over time, as necessary to meet the needs of the customer organization.

Furthermore, business planning models developed and deployed using system 500 may now readily evolve and adapt to meet different and/or changing business needs while remaining consistent with industry-standard best practices. Furthermore, as best practices change, dynamic business planning model 518 may adapt to comply with the new best practices.

FIG. 6 illustrates an example block diagram of a system 600, which may be used for implementations described herein. Example system 600 is capable of supporting or running various hardware and/or software modules and associated methods discussed with reference to FIGS. 1 and 5. Note that certain implementations may be implemented using one or more standalone applications (for example, residing in a user device) and/or one or more web-based applications implemented using a combination of client-side and server-side code. While system 600 performs implementations described herein, in other implementations, any suitable component or combination of components associated with system 600 or any suitable processor or processors associated with system 600 may facilitate performing the implementations described herein. In various implementations, system 600 may not have all of the components shown and/or may have other elements including other types of components instead of, or in addition to, those shown herein.

General system 600 includes user devices 660-690, including one or more desktop computers 660, one or more notebook computers 670, one or more smartphones 680, one or more mobile phones 685, and one or more tablets 690. General system 600 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although system 600 is shown with five user devices, any number of user devices can be supported.

A web server 610 is used to process requests from web browsers and standalone applications for web pages, electronic documents, enterprise data or other content, and other data from the user computers. Web server 610 may also provide push data or syndicated content, such as RSS feeds, of data related to enterprise operations.

An application server 620 operates one or more applications. The applications can be implemented as one or more scripts or programs written in any programming language, such as Java, C, C++, C #, or any scripting language, such as JavaScript or European computer manufacturers association script (ECMAScript), Perl, hypertext preprocessor (PHP), Python, Ruby, or tool command language (TCL). Applications can be built using libraries or application frameworks, such as Rails, Enterprise JavaBeans, or .NET. Web content may be created using hypertext markup language (HTML), cascading style sheets (CSS), and other web technology, including templating languages and parsers.

The data applications running on application server 620 are adapted to process input data and user computer requests and can store or retrieve data from data storage device or database 630. Database 630 stores data created and used by the data applications. In some implementations, database 630 includes a relational database that is adapted to store, update, and retrieve data in response to SQL format commands or other database query languages. Other implementations may use unstructured data storage architectures and Not Only SQL (NoSQL) databases.

In some implementations, application server 620 includes one or more general-purpose computers capable of executing programs or scripts. In some implementations, web server 610 is implemented as an application running on the one or more general-purpose computers. Web server 610 and application server 620 may be combined and executed on the same computers.

An electronic communication network 640-650 enables communication between user computers 660-690, web server 610, application server 620, and database 630. In some implementations, networks 640-650 may further include any form of electrical or optical communication devices, including wired network 640 and wireless network 650. Networks 640-650 may also incorporate one or more local-area networks, such as an Ethernet network, wide-area networks, such as the Internet; cellular carrier data networks; and virtual networks, such as a virtual private network.

System 600 is one example for executing applications according to some implementations. In some implementations, application server 610, web server 620, and optionally database 630 can be combined into a single server computer application and system. In further implementations, virtualization and virtual machine applications may be used to implement one or more of application server 610, web server 620, and database 630.

In still further implementations, all or a portion of the web and application serving functions may be integrated into an application running on each of the user computers. For example, a JavaScript application on the user computer may be used to retrieve or analyze data and display portions of the applications.

In various implementations, system 600 may not have all of the components shown and/or may have other elements including other types of components instead of, or in addition to, those shown herein.

With reference to FIGS. 5 and 6, developer system(s) 512, customer administrator system(s) 522, and customer end-user system(s) 524 of FIG. 5 may be implemented in whole or in part via one or more of desktop computer 660, notebook computer 670, smartphone 680, mobile phone 685, and tablet 690 of FIG. 6 and/or other computing devices such as computing system 500 of FIG. 5. In some implementations, computing devices 660-690 run browsers, e.g., used to display developer UI(s) 526 and UIs of customer administrator system(s) 522 and customer end-user system (s) 524 of FIG. 5.

In some implementations, browsers of systems 512, 522, and 524 of FIG. 5 connect to the Internet, represented by wired network 640 and/or wireless network 650 as shown in FIG. 6, to access one or more network-coupled servers, databases, and/or associated cloud-based functionality, as represented by modules 514-520 of FIG. 5. Note that one or more of web server 610, application server 620, and data storage device or database 630 shown in FIG. 6 may be used to host software corresponding to modules 514-520 of FIG. 5, as detailed more fully below.

In some implementations, model artifact constructor 516, planning model generation framework 514 (including accompanying flex dimension framework 536, feature-artifact mapping module 538, runtime model generator 540, dynamic integrator 542, and UI generator 544), dynamic business planning module 518 and accompanying model adaptation module 546 (including model specifications 548, question generator 550, and answer incorporator 552), and packaging, delivery, deployment, and runtime system 520 (and accompanying cloud-deployed package 554) of FIG. 5 run in a cloud computing environment that includes a collection of plural web servers 610, application servers 620, and data storage devices 630 shown in FIG. 6.

For example, in some implementations, planning model generation framework 514 and model artifact constructor 516 of FIG. 5 run on a process cloud that communicates with a document cloud via an integration mechanism, e.g., middleware, APIs, web services, etc. The document cloud maintains data storage devices 630 of FIG. 6 to maintain data that is generated by customers, e.g., via customer end-user systems 524 of FIG. 5 through use of cloud-deployed package 554. The process cloud in combination with the document cloud act as an overall cloud that supports development, deployment, dynamic adaptation, and use of dynamic software applications and accompanying models (e.g., dynamic business planning model 518 of FIG. 5) shown in FIG. 5.

In general, software developers e.g., users of developer systems 512 of FIG. 5, may subscribe to certain cloud services to facilitate development of software applications and storage of associated files. A cloud service that is configured for software application or process flow development is called a process cloud service (PCS).

A process cloud service may employ a networked database, e.g., data storage device 630 of FIG. 6 or database 120 of FIG. 1, to store files and other objects used by a given software program being developed. Server-side development environments may be accessible to developers via browsers. The development environments may be backed by the PCS, such that developed software application files are stored in the PCS database corresponding to the one or more of data storage devices 630 of FIG. 6 or database 120 of FIG. 1.

A document cloud may include document management functionality in communication with folder structures, and documents and may incorporate functionality for adding rich metadata documents and folders. The document management functionality may include metadata services (MDS) for characterizing folders and documents and associated structures with various types of metadata. The document management functionality may further include software (which may include a combination of webpage code from web server 610 of FIG. 6 and supporting application code of application server 620 of FIG. 6, where the webpage code may call the application code using web services, APIs, etc.) for generating one or more customer UI display screens, e.g., UI display screens presented via browsers of customer administrator systems 522 and customer end-user systems 524 of FIG. 5.

In some implementations, the UI display screens include accompanying UI controls and associated options. Example options include options to browse, create, delete, define, upload, download, etc., folders, structures, and documents, etc., as maintained via the folder structures and documents.

In some implementations, browsers used by developer system 512, customer administrator system 522, and customer end-user system 524 of FIG. 5, interface with web servers 610 shown in FIG. 6 to access websites and accompanying webpage code, which is backed by applications used to implement modules 516-520 of FIG. 5. The webpage code of web servers 610 of FIG. 6 uses web services, APIs, and/or other interfacing mechanisms to communicate with application software hosted on application servers 620 of FIG. 6 of the cloud, which includes a collection of web servers 610, application servers 620, and data storage devices 630 of FIG. 6.

Various implementations discussed herein may provide substantial benefits in terms of providing efficiencies in systems and methods that achieve a new and useful end as they pertain to new software adaptability. In particular, certain implementations discussed herein uniquely leverage input from customers, the input of which may change over time as user needs change, to enable substantial hereto-for-not possible or practical dynamic software model reconfiguration and/or reconstruction.

Certain implementations may provide virtually automatic incorporation of such inputs into a seamlessly adaptable software package that is responsive to the changing user needs and automatically seamlessly handles software integrations.

Accordingly, various implementations provide new capabilities for efficient software adaptation, in part by uniquely leveraging associations between user-provided answers to questions, sets of software model artifacts, sets of software functionality, and mappings or relationships.

Figure 7:
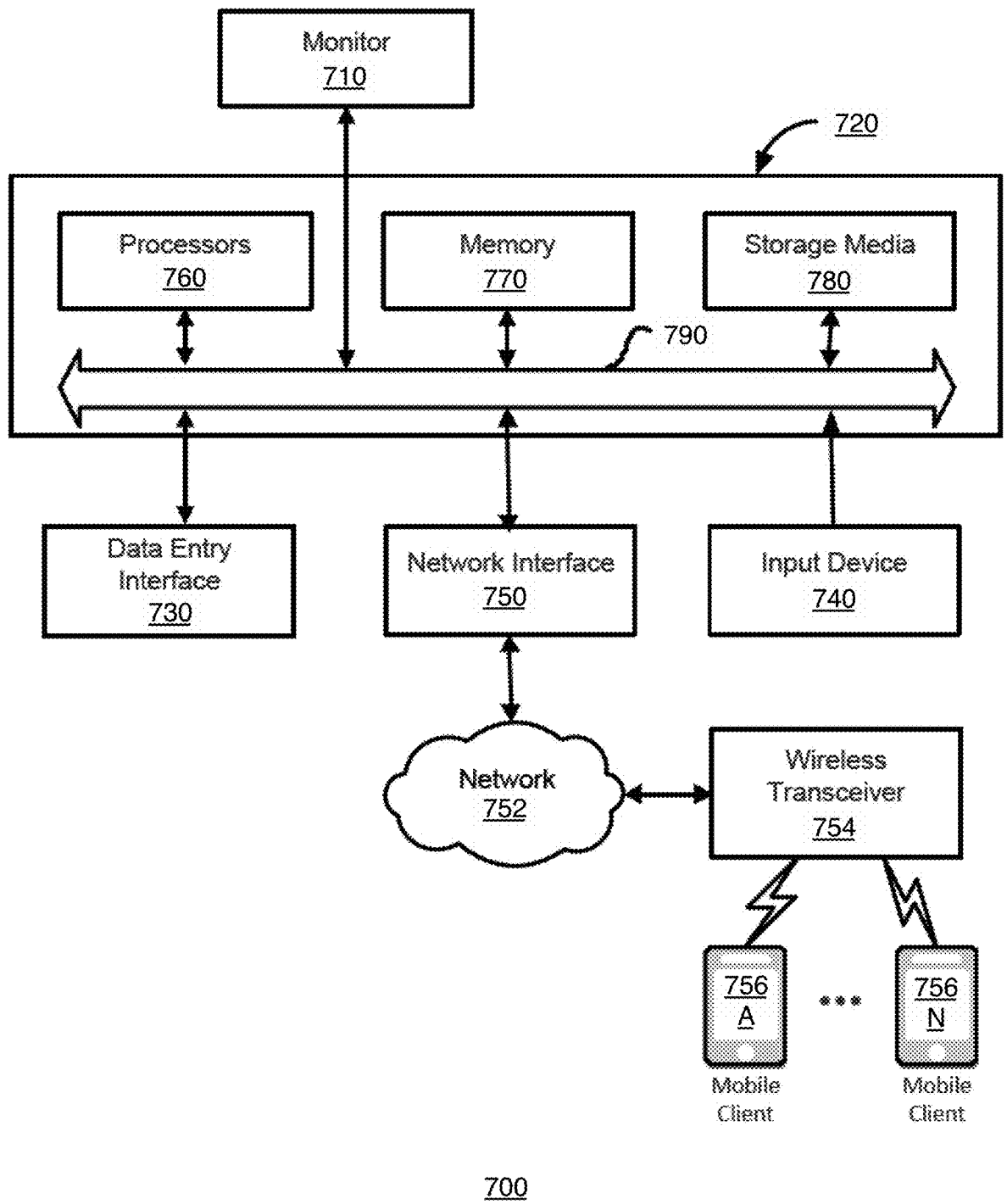
FIG. 7 illustrates an example block diagram of a network environment, which may be used for implementations described herein.

FIG. 7 illustrates an example block diagram of a network environment 700, which may be used for implementations described herein. Network environment 700 is merely illustrative and not intended to limit the scope of the claims. One of ordinary skill in the art would recognize other variations, modifications, and alternatives. For example, network environment 700 may be implemented in a distributed client-server configuration having one or more client devices in communication with one or more server systems.

In one exemplary implementation, network environment 700 includes a display device such as a monitor 710, a computer 720, a data entry interface 730 such as a keyboard, touch device, and the like, an input device 740, a network interface 750, and the like. Input device 740 is typically implemented as a computer mouse, a trackball, a track pad, wireless remote, tablet, touch screen, and the like. Moreover, input device 740 typically allows a user to select and operate objects, icons, text, characters, and the like that appear, for example, on the monitor 710.

Network interface 750 may include an Ethernet card, a modem (telephone, satellite, cable, integrated services digital network (ISDN), etc.), an asynchronous digital subscriber line (DSL) unit, and the like. Furthermore, network interface 750 may be physically integrated on the motherboard of computer 720, may be a software program, such as soft DSL, or the like.

Network environment 700 may also include software that enables communications over communication network 752 such as the hypertext transfer protocol (HTTP), transmission control protocol/Internet protocol (TCP/IP), real-time transport protocol/real-time streaming protocol (RTP/RTSP), protocols, wireless application protocol (WAP), Institute of Electrical and Electronics Engineers (IEEE) 802.11 protocols, and the like. In addition to and/or alternatively, other communications software and transfer protocols may also be used, for example Internetwork packet exchange (IPX), user datagram protocol (UDP) or the like.

Communication network 752 may include a local area network, a wide area network, a wireless network, an Intranet, the Internet, a private network, a public network, a switched network, or any other suitable communication network, such as for example cloud networks. Communication network 752 may include many interconnected computer systems and any suitable communication links such as hardwire links, optical links, satellite or other wireless communications links such as Bluetooth, WIFI, wave propagation links, or any other suitable mechanisms for communication of information. For example, communication network 752 may communicate to one or more mobile wireless devices 756A-N, such as mobile phones, tablets, and the like, via a base station such as wireless transceiver 754.

Computer 720 may include familiar computer components such as one or more processors 760, and memory storage devices, such as a memory 770, e.g., random access memory (RAM), storage media 780, and system bus 790 interconnecting the above components. In one embodiment, computer 720 is a PC compatible computer having multiple microprocessors, graphics processing units (GPU), and the like. While a computer is shown, it will be readily apparent to one of ordinary skill in the art that many other hardware and software configurations are suitable for use with implementations described herein. While computer 720 performs implementations described herein, in other implementations, any suitable component or combination of components associated with computer 720 or any suitable processor or processors associated with computer 720 may facilitate performing the implementations described herein. In various implementations, computer 700 may not have all of the components shown and/or may have other elements including other types of components instead of, or in addition to, those shown herein.

Memory 770 and Storage media 780 are examples of non-transitory tangible media for storage of data, audio/video files, computer programs or program instructions, and the like. Other types of tangible media include disk drives, solid-state drives, floppy disks, optical storage media such as compact disc-read only memory (CD-ROMS) and bar codes, semiconductor memories such as flash drives, flash memories, read-only-memories (ROMS), battery-backed volatile memories, networked storage devices, cloud storage, and the like.

Although the description has been described with respect to particular embodiments thereof, these particular embodiments are merely illustrative, and not restrictive. For example, while various implementations discussed herein address development, deployment, and use of dynamic business planning models used to implement cloud-based enterprise software applications and associated services, implementations are not limited thereto.

Various implementations need not be deployed via an Internet cloud, but instead may be hosted on an internal enterprise server on a local network. Furthermore various implementations may be implemented as desktop software, such that the incremental updating happens on the end-user computer on which the software leveraging the dynamic planning model runs. In addition, implementations are not limited to use in conventional business applications and computing environments, and may be used, for example, by governments, universities, and other organizations to facilitate various types of planning activities. In addition, implementations need not be limited to planning software, but may be used to dynamically update different types of software that may benefit by the ability to dynamically adapt to specific needs and/or changing needs of an organization and/or associated computing environment.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for providing process modes, the method comprising:
   receiving, from a server, view descriptors at a client device, wherein the view descriptors include rendering descriptors and behavior descriptors associated with a business process model having a plurality of process elements, and wherein the rendering descriptors define how the business process model is rendered and the behavior descriptors that define how the business process model behaves when rendered;
   storing the view descriptors at the client device;
   associating the business process model with a plurality of process modes having different functions that present different faces or views of the business process model depending on a process mode selection from the plurality of process modes;
   receiving, at the client device, the process mode selection from a user, wherein the process mode selection selects a process mode from the plurality of process modes, wherein the selected process mode is associated with a particular set of the view descriptors, wherein the process modes include one or more of a process designer mode, a process read-only mode, and a process play mode, and wherein each one of the view descriptors from the particular set of the view descriptors is associated with a respective processing element of the business process model;

retrieving the business process model from a server; and applying the business process model at the client device based on the particular set of the view descriptors associated with the selected process mode.

2. The method of claim 1, wherein the process modes of the business process model are defined by combinations of rendering descriptors and behavior descriptors.

3. The method of claim 1, wherein the view descriptors include a plurality of sets of the view descriptors, and wherein each set of the view descriptors is associated with a combination of rendering descriptors and behavior descriptors.

4. A non-transitory computer-readable storage medium carrying program instructions thereon, the instructions when executed by one or more processors cause the one or more processors to perform operations comprising:

receiving, from a server, view descriptors at a client device, wherein the view descriptors include rendering descriptors and behavior descriptors associated with a business process model having a plurality of process elements, and wherein the rendering descriptors define how the business process model is rendered and the behavior descriptors that define how the business process model behaves when rendered;

storing the view descriptors at the client device;

associating the business process model with a plurality of process modes having different functions that present different faces or views of the business process model depending on a process mode selection from the plurality of process modes;

receiving, at the client device, the process mode selection from a user, wherein the process mode selection selects a process mode from the plurality of process modes, wherein the selected process mode is associated with a particular set of the view descriptors, wherein the process modes include one or more of a process designer mode, a process read-only mode, and a process play mode, and wherein each one of the view descriptors from the particular set of the view descriptors is associated with a respective processing element of the business process model;

retrieving the business process model from a server; and applying the business process model at the client device based on the particular set of the view descriptors associated with the selected process mode.

5. The computer-readable storage medium of claim 4, wherein the process modes of the business process model are defined by combinations of rendering descriptors and behavior descriptors.

6. The computer-readable storage medium of claim 4, wherein the view descriptors include a plurality of sets of the view descriptors, and wherein each set of the view descriptors is associated with a combination of rendering descriptors and behavior descriptors.

7. An apparatus comprising:

one or more processors; and logic encoded in one or more non-transitory computer-readable storage media for execution by the one or more processors and when executed operable to perform operations comprising:

receiving, from a server, view descriptors at a client device, wherein the view descriptors include rendering descriptors and behavior descriptors associated with a business process model having a plurality of process elements, and wherein the rendering descriptors define how the business process model is rendered and the behavior descriptors that define how the business process model behaves when rendered;

storing the view descriptors at the client device;

associating the business process model with a plurality of process modes having different functions that present different faces or views of the business process model depending on a process mode selection from the plurality of process modes;

receiving, at the client device, the process mode selection from a user, wherein the process mode selection selects a process mode from the plurality of process modes, wherein the selected process mode is associated with a particular set of the view descriptors, wherein the process modes include one or more of a process designer mode, a process read-only mode, and a process play mode, and wherein each one of the view descriptors from the particular set of the view descriptors is associated with a respective processing element of the business process model;

retrieving the business process model from a server; and applying the business process model at the client device based on the particular set of the view descriptors associated with the selected process mode.

8. The apparatus of claim 7, wherein the process modes of the business process model are defined by combinations of rendering descriptors and behavior descriptors.

* * * * *